Figure 1:
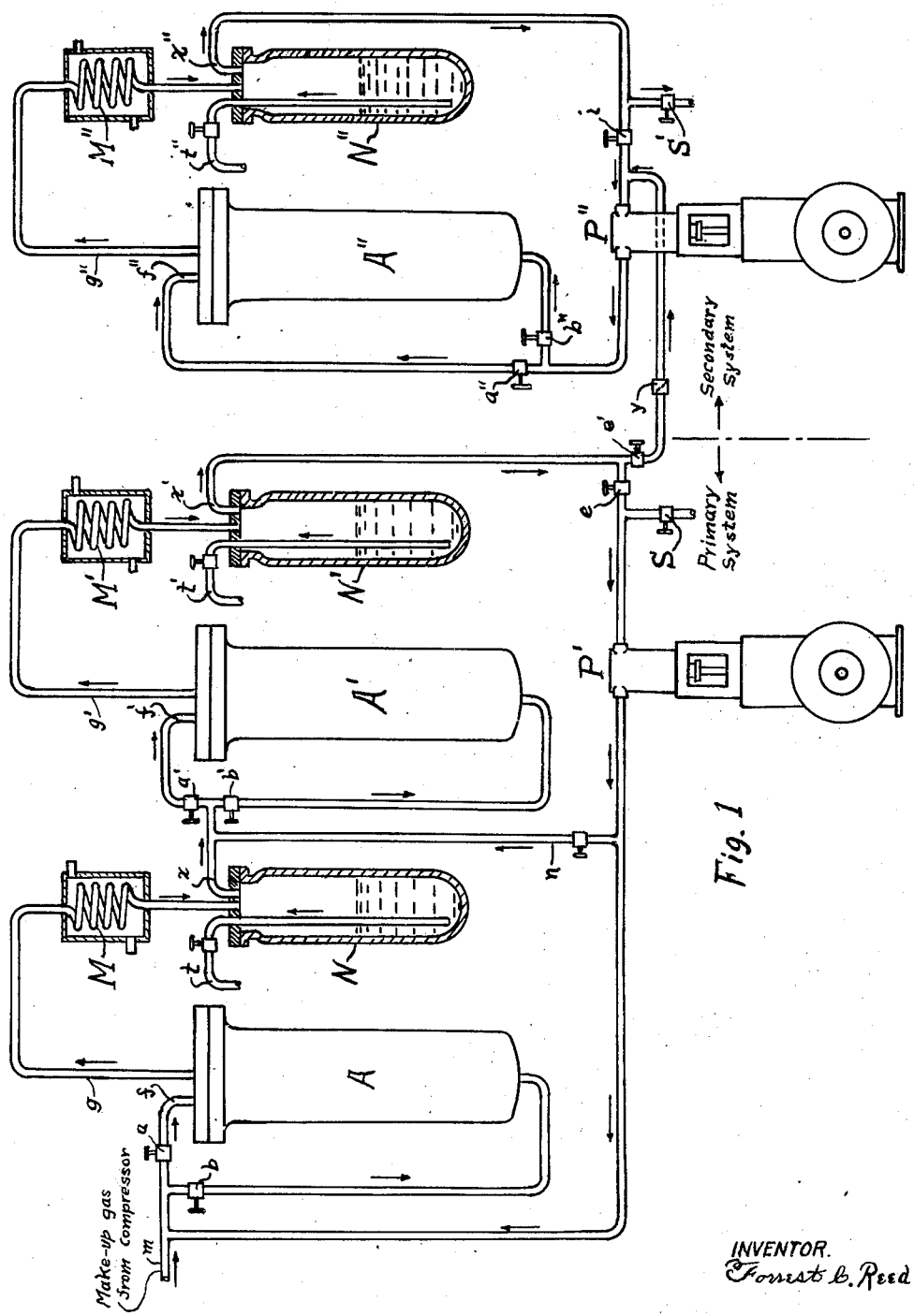

May 15, 1934.  F. C. REED  1,959,219
PROCESS OF PRODUCING COMPOUNDS CONTAINING CARBON, HYDROGEN, AND OXYGEN
Filed Sept. 8, 1932   2 Sheets-Sheet 1

INVENTOR.
Forrest C. Reed

Patented May 15, 1934

1,959,219

UNITED STATES PATENT OFFICE 1,959,219

PROCESS OF PRODUCING COMPOUNDS CONTAINING CARBON, HYDROGEN, AND OXYGEN

Forrest C. Reed, Kansas City, Mo.

Application September 8, 1932, Serial No. 632,199

21 Claims. (Cl. 260—116)

The present invention has reference to the synthetic production of compounds containing carbon, hydrogen, and oxygen from the oxides of carbon, methane, and hydrogen, and more particularly to improvements in such processes involving the synthesis of alcohols, aldehydes, and organic acids in the presence of suitable catalytic agents at elevated temperature and pressure.

It is known that alcohols, aldehydes, and organic acids can be produced synthetically by passing suitable gas mixtures, as illustrated in the equations below, over suitable catalytic agents at elevated temperature and pressure. The final compounds in the following equations are written in the condensed form rather than showing the hydroxyl (OH) and carboxyl (COOH).

Alcohols:
1. $CO + 2H_2 = CH_4O$ (methyl alcohol)
2. $CO_2 + 3H_2 = CH_4O + H_2O$ (methyl alcohol) + water
3. $CO_2 + CH_4 + 2H_2 = 2CH_4O$ (methyl alcohol)
4. $CO_2 + CO + 5H_2 = 2CH_4O + H_2O$ (methyl alcohol) + water
5. $CO + CH_4 + H_2 = C_2H_6O$ (ethyl alcohol)
6. $CO_2 + 3CH_4 = 2C_2H_6O$ (ethyl alcohol)
7. $CO_2 + CO + 4CH_4 + H_2 = 3C_2H_6O$ (ethyl alcohol)

Aldehydes:
8. $CO + H_2 = CH_2O$ (formaldehyde)
9. $CO_2 + CH_4 = 2CH_2O$ (formaldehyde)
10. $CO_2 + CO + CH_4 + H_2 = 3CH_2O$ (formaldehyde)
11. $CO + CH_4 = C_2H_4O$ (acetaldehyde)
12. $CO_2 + CH_4 + H_2 = C_2H_4O + H_2O$ (acetaldehyde) + water
13. $CO_2 + CO + 2CH_4 + H_2 = 2C_2H_4O + H_2O$ (acetaldehyde) + water Organic acids:
14. $CO_2 + H_2 = CH_2O_2$ (formic acid)
15. $2CO + 2H_2 = C_2H_4O_2$ (acetic acid)

It is known that the above reactions can be carried out according to the well known Haber process (United States Patent Number 1,202,995) for the production of ammonia, as for instance, in the synthetic production of methyl alcohol where a gaseous mixture consisting of two volumes of hydrogen to one volume of carbon monoxide (see Equation 1 above) is passed over a suitable catalyst (such as zinc oxide or zinc chromate) at elevated temperature and pressure where a portion of the gases (depending on space velocity, temperature, and pressure) are converted into methyl alcohol which is condensed at lowered temperature and removed from the circuit, the remaining unconverted gases are recirculated over the same catalyst with fresh make-up gases to replace the gases converted to methyl alcohol and removed. The usual operating temperature of catalyst is from 300 to 500° C. The operating pressure is usually from 150 to 400 atm., but operation is possible at either higher or lower temperatures and pressures.

In the preparation of the reacting gases there is present small quantities of non-reacting gases such as argon, nitrogen, and in some instances, methane (as in the production of methyl alcohol from carbon monoxide and hydrogen) which accumulate in the circulatory system of the process until the concentration reaches a degree where production cannot be maintained and then the non-reacting gases must be purged together with the valuable reacting gases. The loss of reacting gases in purging must obviously depend on the concentration of non-reacting gases in the system.

The object of the present invention is then to provide means for increasing the concentration of non-reacting gases to a degree where purging becomes economical thereby reducing the loss of valuable reacting gases when purging and permitting the use of reacting gases having a high initial content of non-reacting gases thereby reducing the cost of the initial purification, to reduce the volume of gas recirculated thereby reducing the size of apparatus, to provide means of purification of the gas, to provide means for purification of the compounds synthesized, to provide improved disposition of catalytic body and direction of flow of gases therein, to provide improved temperature control, and to obtain flexibility of operation.

In order to accomplish these objects and other advantages as may be brought out in specifications and drawings, I propose to operate, in combination with each other, two complete systems of converters. One system of converters concentrates the non-reacting gases to a degree economical for the the desired production of compounds and the other system of converters further concentrates the non-reacting gases to a degree economical for purging. After leaving the converters of the first system, part of the uncombined gases are recirculated thru the same converters while the remaining part is circulated thru the second system for the purpose of further increasing the concentration of non-reacting gases. The first system of converters is hereinafter referred to as the primary system and the second system is referred to as the secondary system. Either of said systems may consist of one or more converters. The primary system consists preferably of two converters, especially where the make-up gas is subject to impurities such as sulphur from compressor lubricating oils in which case the first converter acts as a purifier and retains such poisons. Some water and other incidental compounds may be formed at times in which case they can be removed after the first converter thereby purifying the products from the remaining converters. The secondary system consists preferably of a single converter, the gases being either recirculated or passed thru the converter but once and then being allowed to escape.

The accompanying drawings illustrate one type of apparatus in which the process of the present invention may be carried out. In the drawings in which like characters of reference designate similar parts throughout the views, Figure 1 is a diagrammatical showing of apparatus adaptable for carrying out the process of the present invention, and Figure 2 is a vertical central section of a converter forming one of the units of the system.

Figure 2:
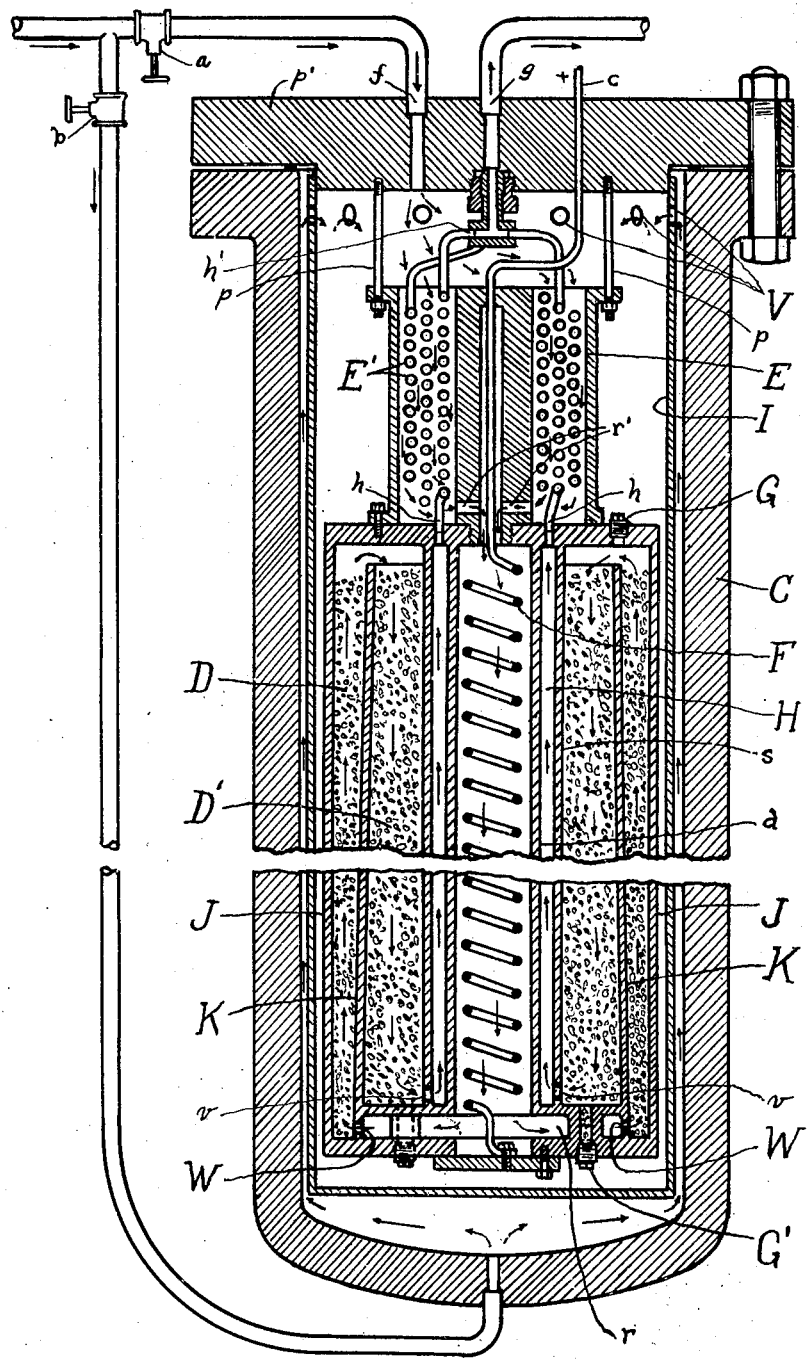

A and A' of Figure 1 are converters of a primary system operating in a series cyclic manner. A" is the converter of a secondary system operating in a cyclic manner. P' and P" are the circulating pumps of the primary and secondary systems respectively. M, M', and M" are suitable condensers and may be of the fractional condensation type. N, N', and N" are receivers for the liquid compounds formed. The flow of the gases thru both systems is in the direction indicated by arrows.

In my United States Patent, 1,639,272, August 16, 1927, for Processes for the direct synthesis of ammonia, I have disclosed figures indicating the advantages of a series of cyclical process of operation (similar in operation to the primary system of the present invention as shown in Figure 1 of the drawings) over the former cyclic processes. In my pending application for patent, Serial Number 527,396, filed April 3, 1931, for Apparatus and process for the direct synthesis of ammonia, I have disclosed further advantages of a process consisting of a primary and a secondary system (similar in operation to the process of the present invention) over the well known cyclic processes. In the prosecution of both of the above patent applications, I have filed, for the examiner's information, detailed calculations showing the advantages over former processes.

The above mentioned processes have similar advantgaes over a simple cyclic process when producing compounds containing carbon, hydrogen, and oxygen according to the present invention as when producing ammonia, for instance, the production of a greater quantity of compounds per unit volume of catalyst with a greatly reduced volume of gas to be recirculated and with a corresponding reduction in size of equipment; the purification of gases in the first converter of the primary system; the removal after first converter of water and other incidentally formed compounds such as unsaturates (ethylene, etc.) thereby permitting the production of more nearly pure compounds in the succeeding converters; the operation of a primary system with low concentration of non-reacting gases and with high space velocities for maximum production of compounds; and the operation of a secondary system with low space velocities (and at increased pressure if desired) for the maximum concentration of non-reacting gases by the circulation of only a small portion of the total gases at high concentration thereby greatly reducing the loss of valuable reacting gases when purging. In addition to these advantages it will be obvious that the process of the present invention permits of the use of catalyst, space velocity, and operating temperature and pressure most suitable for each step of the process.

These advantages can be shown by calculations as referred to above, for instance, it can be shown that the process of the present invention will produce approximately 50% more products per unit volume of catalyst with less gas recirculated and with a purge loss of approximately one fourth that of the former cyclic processes operating under like conditions. These advantages are, however, apparent without such calculations when the following facts are considered:

Since the purge loss, or the volume of reacting gases purged with the non-reacting gases depends on the percentage (concentration) of non-reacting gases in the system purged, it is desirable to obtain a maximum increase in this concentration for each passage of the gases over a catalyst and still maintain maximum production at the same time. It is obvious that with each passage of the gases over a catalyst, the higher the rate of conversion and removal of reacting gases from the system, the higher will be the rate of increase of concentration of the non-reacting gases remaining in the system. Because of the partial pressure of the non-reacting gases, the effective operating pressure and consequently the rate of conversion is reduced with high concentrations. In order, therefore, to offset this reduced rate of conversion at high concentration, it is necessary to operate at lowered space velocity and temperature and preferably with increased pressure in order to obtain a maximum increase of concentration with each passage of the gases over catalyst. But maximum production or space-time yield per unit volume of catalyst requires higher space velocities and lower concentrations. Now, as pointed out above, this is just the opposite requirement for maximum increase of concentration, for while the production or space-time yield is greater with higher space velocities, yet the actual percentage of conversion and consequently the increase of concentration is less per unit volume of gas circulated. It is, therefore, not possible to operate a single converter, as in former cyclic processes, efficiently for both high concentrations and maximum production, but it is possible to operate the primary system of the present invention efficiently for maximum production and to operate the secondary system efficiently for high concentration because it is necessary to handle only a small portion of the total reacting gases at high concentration as will be seen by further reference to the operation of the process as shown in drawings.

Referring to Figure 2, C is a cylindrically formed pressure sustaining vessel, D and D' are catalytic materials, J is the outer wall of the catalytic chamber in which the wall K divides the catalytic mass concentrically into an inner and an outer body. The catalyst chamber J is filled with suitable catalyst D and D' and is supported by suitable means such as by bolts $p$ to cover $p'$. The wall K could be either straight or preferably tapering conically as shown. Dividing the catalytic mass in this manner makes it possible to proportion the volume of the two catalytic bodies in such a manner that the heat generated by reaction is equalized and for reasons of strength the cooler part of the catalytic mass is nearest the walls of the pressure sustaining vessel C. E is a heat exchanger of suitable design, here shown as a plurality of spirally-wound tubes E', two or more tubes being wound together similar to a multiple threaded screw thread and communicatively connected to narrow passage H at h and to outlet connection g at h'. The cylindrically formed walls s and d form the narrow passage H communicating at bottom with inner catalyst body at v and with heat exchanger E at h. G and G' are holes thru upper and lower ends respectively of the catalyst chamber for depositing and removing catalyst. I is a cylindrically formed shell closed at bottom and forming a dead space between itself and the wall of pressure sustaining vessel C. The pressure within the apparatus is equalized by suitable openings V. The space enclosing heater F is communicatively joined to outer catalyst space by passage r formed at the bottom of the catalyst chamber, and holes W.

The process may be carried out in the following manner with the production of methyl alcohol from carbon monoxide and hydrogen as an illustration: Carbon monoxide and hydrogen mixed in suitable proportions are supplied at m in Figure 1, the flow thru the system being in the direction indicated by arrows. The flow thru converters A, A', and A'' can be seen by referring to Figure 2. Electric current is supplied at c to heater F and a small amount of the gas mixture is admitted at f and passed thru the converter in the direction of arrows and out at g while the temperature of the catalyst is brought up to that required for reaction. The pressure within the apparatus is then gradually increased to the desired operating pressure.

The gas entering at f is conducted downwardly over the outside of tubes E' of heat exchanger E, thru holes r' to space surrounding heater F, from thence thru passage r and holes W at bottom of catalyst chamber to the outer catalytic body D where the flow is upward to the top and then downwardly thru the inner catalytic body D', thru holes v to narrow passage H, then upwardly into the inside of heat exchanger tubes E' at h and out at h' into outlet g. The ingoing gases are thus heated by the outgoing gases and the heat of reaction is usually sufficient to make the process auto-thermal in which case the electric heater is used only in starting the reaction. The reaction could as well be started by external heating or heat exchange, or the process could be operated continuously with external heating or heat exchange of the gases. In order to control the heat exchange, part or all of the gases can be admitted at bottom of converter by manipulation of valves a and b, the gases passing upwardly between cylindrical shell I and wall of pressure sustaining vessel C, thru holes V and over heat exchanger as before.

Referring to Figure 1, the mixture of carbon monoxide and hydrogen gases has passed thru converter A of the primary system as above described, any poisons present such as sulphur from the compressor lubricating oil has been absorbed by the catalyst, any traces of carbon dioxide have caused the formation of water, and part of the reacting gases have combined to form methyl alcohol with possible traces of other incidental compounds. All of these gases are now conducted thru pipe g to condenser M where they are cooled and the liquid compounds collected in the receiver N. The liquid contents of receiver N can be removed thru pipe t extending below the surface of the liquid so that the operating pressure forces the liquids out. The unconverted gases now purified except for non-reacting and non-condensable gases, such as argon, nitrogen, and possibly methane, are then conducted thru pipe x to converter A' where the procedure thru converter is the same as described for converter A, all or part of the gases passing thru valve a' to top of converter or thru valve b' to bottom of converter.

A portion of the gas leaving receiver N' thru pipe x' is recirculated, with the fresh make-up gas entering at m, thru converters A and A' by means of circulating pump P', and the remaining portion of the gases leaving receiver N' is circulated thru the separate secondary sytem of converter A'' by means of circulating pump P'' in the same manner as described for converter A. The volume of gases passing thru either system is preferably controlled by valves e and e' and by the speed of the circulating pumps P' and P''. The non-reacting gases are allowed to accumulate in the system of converters A and A' to a degree of concentration permissible with the desired maximum production of compounds (methyl alcohol as illustrated in this case). In order not to further increase the degree of concentration of non-reacting gases in converters A and A' of the primary system, a volume of gas, sufficient at this degree of concentration to carry away non-reacting gases, equal in volume to the non-reacting gases entering the primary system with the make-up gas at m, must be passed into the secondary system of converter A'' where the concentration is further increased to a degree where purging becomes economical and then the secondary system is purged, preferably continuously, thru valve S'. The primary system can be purged occasionally at S if desired. The purged gas can be used as fuel or otherwise disposed of. In order to equalize conversion in converters A and A' and otherwise control operation, part of the gas in primary system can be by-passed at n.

Instead of the circulating pump P', the recirculated gases in the primary system might be returned to the last stage of compressor furnishing the make-up gases, and returned to the system therewith. Instead of the circulating pump P'', the gases could be forced thru the secondary system by the operating pressure of the primary system, in which case the gases would pass thru the converter A'' but once, and then purged, or with the circulating pump P'', the pressure of the secondary system can be boosted above that of the primary system and the gases either recirculated or discharged after converter A''. When the gases in the secondary system are recirculated at increased pressure, a reversal of flow is prevented by the check valve y of Figure 1. The material of the apparatus should be such as will withstand any corrosive action of the gases.

While the apparatus shown in Figure 1, has two converters in the primary system and one converter in the secondary system yet either system could as well consist of one or more converters without departing from the spirit and scope of the present invention. It is also possible to combine one secondary system with two or more primary systems, or to operate the process with a purifier in advance of the primary system of Figure 1. There is, however, further advantage in the use of converter A as a purifier within the primary system because it permits the use of oil for lubricant in circulating pump P' which is in the same relation to primary system as the compressor furnishing the make-up gas at m. The catalyst of converter A should be of a rugged type to operate at higher temperature to withstand poisons, while the catalysts of converters A' and A" should be of the more sensitive type to operate at lower temperatures. The removal of compounds from the system after each converter could as well be effected by absorption with suitable solvents. The products can be further purified by continuous fractional rectification or distillation at the pressure of operation or at reduced pressure.

While the production of methyl alcohol has been used as an illustration of the process of the present invention as described above, yet it is obvious that this process will be equally efficient in the production of other compounds containing carbon, hydrogen, and oxygen, such as ethyl alcohol, aldehydes, and organic acids. The catalyst, space velocity, operating pressure and temperature, and degree of cooling most suitable for each step in the process is made possible by the process of the present invention.

It will be seen from the above description that in order to obtain high concentrations of non-reacting gases, it is necessary to handle only a small part of the total gases in the secondary system operating at high concentration where the space velocity can be reduced and the pressure increased to offset the effect of high concentration. When the make-up gas has an initial concentration of as much as 4% of non-reacting gases, the volume of gases passed into the secondary system is usually less than one half of the volume of gases recirculated in the primary system and about one-fourth the total volume of gases entering the first converter of the primary system. The advantages of high concentrations possible in the process of the present invention are obvious from the following example: Assuming the initial concentration of non-reacting gases entering with the make-up gases to be 4% and the usual concentration of 10% in the circulatory system of the former cyclic processes, then since 90 volumes of reacting gases are lost with each 10 volumes of non-reacting gases purged, the purge loss is =

$$\frac{100-10}{10} \times 4 = 36\%$$

of the total volume of gases processed, whereas, in the process of the present invention, a concentration of 35% in the secondary system is easily possible while producing a greater quantity of compounds and recirculating less gas per unit volume of catalyst, and the purge loss =

$$\frac{100-35}{35} \times 4 = 7.43\%$$

of the total volume of gases processed. The present invention, therefore, permits the economical use of reacting gases containing a relatively large percentage of non-reacting gases, and thereby reducing the initial cost of purification and permitting the use of gases which would be prohibitive in former processes.

The process of the present invention is not limited to gases from any particular source. The reacting gases may be produced in any suitable manner from such sources as coke oven gas, water gas, electrolytic and fermentation processes. Carbon dioxide may also be produced from gases of combustion. One method of producing gas mixtures of carbon monoxide and hydrogen is to crack hydrocarbons to suitable proportions of methane and hydrogen, then after removing the free carbon, add a suitable volume of carbon dioxide and subject the gas mixture to high temperature to give any desired ratio of hydrogen to carbon monoxide.

Obviously there are other methods of carrying out the present invention, therefore I do not wish to be understood as limiting myself except as required by the following claims when construed in the light of the prior art.

What I claim is:

1. The process of producing compounds containing carbon, hydrogen, and oxygen, by passing hydrogen and an oxide of carbon mixed in suitable proportions over a suitable catalytic agent at elevated temperature and pressure, then removing at lower temperature the compounds formed, then again passing a portion of the residual gases over the same catalytic agent, while passing another portion of said residual gases over a second catalytic agent in like manner, and removing at lower temperature after each catalytic agent the compounds formed by each passage of gases over said catalytic agents.

2. The process of producing compounds containing carbon, hydrogen, and oxygen, by passing hydrogen and an oxide of carbon mixed in suitable proportions over a suitable catalytic agent at elevated temperature and pressure, then removing at lower temperature the compounds formed, then again passing a portion of the residual gases over the same catalytic agent, while passing the remaining portion of said residual gases over another separate catalytic agent in like manner, and removing at lower temperature after each catalytic agent the compounds formed by each passage of gases over said catalytic agents, while purging from the circulatory system of said separate catalytic agent, and while replacing the quantity of gases removed with fresh hydrogen and an oxide of carbon supplied to the first catalytic agent.

3. The process of producing compounds containing carbon, hydrogen, and oxygen, by passing hydrogen and an oxide of carbon in suitable proportions over a catalytic agent at elevated temperature and pressure, then removing at lowered temperature the compounds formed, then again passing a portion of the residual gases over the same catalytic agent, while passing the remaining portion of said residual gases over a second separate catalytic agent in like manner, and removing at lower temperature the compounds formed, while passing the ingoing gases in heat exchange with the outgoing gases from each of said catalytic agents.

4. The process of producing compounds containing carbon, hydrogen, and oxygen, by passing a gaseous mixture of hydrogen and an oxide of carbon in suitable proportions over a catalytic agent at elevated temperature and pressure, then removing at lower temperature the compounds formed, then again passing a portion of the residual gases over the same catalytic agent, while passing another portion of said residual gases over a second catalytic agent in like manner, and removing at lower temperature the compounds formed, and passing the ingoing gases in heat exchange with the outgoing gases from each of said catalytic agents, and purging from the circulatory system of said second catalytic agent, while replacing the gases removed with fresh gas supplied to the first of said catalytic agents.

5. The process of producing compounds containing carbon, hydrogen, and oxygen, by passing hydrogen, methane, and an oxide of carbon, mixed in suitable proportions over a suitable catalytic agent at elevated temperature and pressure, then removing at lower temperature the compounds formed, then again passing a portion of the residual gases over the same catalytic agent, while passing another portion of said residual gases over another separate catalytic agent in like manner, and removing at lower temperature the compounds formed.

6. The process of producing compounds containing carbon, hydrogen, and oxygen, by passing hydrogen, methane, and an oxide of carbon, mixed in suitable proportions over a catalytic agent at elevated temperature and pressure, then removing at lower temperature the compounds formed, then recirculating a portion of the residual gases over the same catalytic agent, while circulating the remaining portion of said residual gases over a second catalytic agent in like manner, and removing at lower temperature the compounds formed, and passing the ingoing gases in heat exchange with the outgoing gases, and purging from the circulatory system of said second catalytic agent, while replacing the gases removed with fresh gases supplied to the first of said catalytic agents.

7. The process of producing compounds containing carbon, hydrogen, and oxygen, by passing methane and an oxide of carbon in suitable proportions over a suitable catalytic agent at elevated temperature and pressure, then removing the compounds formed, then again passing a portion of the residual gases over the same catalytic agent, while passing another portion of said residual gases over a second catalytic agent in like manner, and removing after each catalytic agent the compounds formed with each passage of the gases over said catalytic agents.

8. The process of producing compounds containing carbon, hydrogen, and oxygen, by passing methane and an oxide of carbon in suitable proportions over a suitable catalytic agent at elevated temperature and pressure, then removing at lower temperature the compounds formed, then again passing a portion of the uncombined gases over the same catalytic agent, while passing the remaining portion of said uncombined gases over another separate catalytic agent in like manner, and removing at lower temperature the compounds formed with each passage of gases over said catalytic agents, and purging from the circulatory system of said separate catalytic agent, while replacing the quantity of gases removed with fresh methane and an oxide of carbon supplied to the first catalytic agent, and passing the ingoing gases in heat exchange with the outgoing gases from each of said catalytic agents.

9. The process of producing compounds containing carbon, hydrogen, and oxygen, by passing hydrogen and an oxide of carbon in suitable proportions at elevated temperature and pressure over suitable catalytic agents arranged in series, and removing after each catalytic agent the compounds formed, then again passing a portion of the residual gases leaving the last catalyst of the series over the same catalytic agents, while passing another portion of said residual gases over another separate catalytic agent in like manner, and removing the compounds formed.

10. The process of producing compounds containing carbon, hydrogen, and oxygen, by passing hydrogen and an oxide of carbon in suitable proportions at elevated temperature and pressure over suitable catalytic agents arranged in series, and removing after each catalytic agent the compounds formed, then again passing a portion of the residual gases leaving the last catalyst of the series over the same catalytic agents, while passing another portion of said residual gases over another separate catalytic agent in like manner, and removing the compounds formed, while purging from the circulatory system of said separate catalytic agent, and replacing the gases removed with fresh gases supplied to the first catalyst of said series.

11. The process of producing compounds containing carbon, hydrogen and oxygen, by passing hydrogen and an oxide of carbon in suitable proportions at elevated temperature and pressure over catalytic agents arranged in series, and removing at lower temperature the compounds formed, then again passing a portion of the residual gases leaving the last catalyst of said series over the same catalytic agents, while passing the remaining portion of said residual gases over another separate catalyst in like manner, and removing at lower temperature the compounds formed, and passing the ingoing gases in heat exchange with the outgoing gases from each of said catalytic agents, and replacing the gases removed with fresh gases supplied to the first catalyst of said series, and purging after said separate catalyst.

12. The process of producing compounds containing carbon, hydrogen, and oxygen, by passing methane and an oxide of carbon in suitable proportions at elevated temperature and pressure over suitable catalytic agents arranged in series, and removing after each catalytic agent the compounds formed, then again passing a portion of the uncombined gases leaving the last catalyst of said series over the same catalytic agents, while passing another portion of said uncombined gases over another separate catalytic agent in like manner, and removing the compounds formed by each passage of the gases over said catalytic agents.

13. The process of producing compounds containing carbon, hydrogen, and oxygen, by passing methane and an oxide of carbon in suitable proportions at elevated temperature and pressure over catalytic agents arranged in series, and removing at lower temperature the compound formed, then again passing a portion of the residual gases leaving the last catalyst of said series over the same catalytic agents, while circulating the remaining portion of said residual gases over another separate catalytic agent, and removing at lower temperature the compounds formed, and passing the ingoing gases in heat exchange with the outgoing gases from each of said catalytic agents, and replacing the gases removed with fresh gases supplied to first catalyst of said series, and purging from the circulatory system of said separate catalytic agent.

14. The process of producing compounds containing carbon, hydrogen, and oxygen, by passing hydrogen, methane, and an oxide of carbon in suitable proportions at elevated temperature and pressure over suitable catalytic agents arranged in series, and removing after each catalytic agent the compounds formed, then again passing a portion of the gases leaving the last catalyst of said series over the same catalytic agents, while passing another portion of the gases leaving the last catalyst of said series over another separate catalytic agent in like manner, and removing the compounds formed.

15. The process of producing compounds containing carbon, hydrogen, and oxygen, by passing hydrogen, methane, and an oxide of carbon in suitable proportions at elevated temperature and pressure over suitable catalytic agents arranged in series, and removing at lower temperature after each catalytic agent the compounds formed, then again recirculating a portion of the residual gases leaving the last catalyst of said series, while circulating the remaining portion of said residual gases over another separate catalytic agent in like manner, and removing at lower temperature the compounds formed, and purging from the circulatory system of said separate catalytic agent, and passing the ingoing gases in heat exchange with the outgoing gases from each of said catalytic agents, and replacing the gases removed with fresh gases supplied to the first catalyst of said series.

16. The process of producing compounds containing carbon, hydrogen, and oxygen, by passing hydrogen and an oxide of carbon over a suitable catalytic agent at elevated temperature and pressure, then removing the compounds formed, then again recirculating a portion of the residual gases over the same catalytic agent, while circulating the remaining portion of said residual gases over a second catalytic agent at increased pressure, and removing the compounds formed, while purging from the circulatory system of said second catalytic agent, and replacing the gases removed with fresh gases supplied to the first catalytic agent.

17. The process of producing compounds containing carbon, hydrogen, and oxygen, by passing methane and an oxide of carbon in suitable proportions over a catalytic agent at elevated temperature and pressure, then removing the compounds formed, then again recirculating a portion of the residual gases over the same catalytic agent, while circulating another portion of said residual gases over a second catalytic agent at increased pressure, and removing the compounds formed, while purging from the circulatory system of said second catalytic agent, and replacing the gases removed with fresh gases supplied to the first catalytic agent.

18. The process of producing compounds containing carbon, hydrogen, and oxygen, by passing methane, hydrogen, and an oxide of carbon in suitable proportions over a catalytic agent at elevated temperature and pressure, and removing the compounds formed, then again recirculating a portion of the residual gases over the same catalytic agent, while circulating the remaining portion of said residual gases over a second catalytic agent at increased pressure, and removing the compounds formed by each passage of said gases over said catalytic agents, while purging from the circulatory system of said second catalytic agent, and replacing the gases removed with fresh gases supplied to the first catalytic agent.

19. The process of producing compounds containing carbon, hydrogen, and oxygen, by passing a gaseous mixture consisting of hydrogen and an oxide of carbon, mixed in suitable proportions over a suitable catalytic agent at elevated temperature and pressure, and removing the compounds formed, then again passing a portion of the residual gases over the same catalytic agent, while passing another portion of said residual gases over a second catalytic agent at increased pressure, and removing the compounds formed, then purging all of the remaining gases from the process, while replacing the gases removed with fresh gases supplied to the first catalytic agent.

20. The process of producing compounds containing carbon, hydrogen, and oxygen, by passing a gaseous mixture consisting of methane and an oxide of carbon, mixed in suitable proportions at elevated temperature and pressure over catalytic agents arranged in series, and removing the compounds formed after each catalytic agent, while recirculating a portion of the residue gases leaving last catalyst of series, and passing the remaining portion of said residue gases over another separate catalytic agent at increased pressure, and removing the compounds formed, then purging all of the remaining gases, while replacing the gases removed with fresh gases supplied to the first catalyst of said series.

21. The process of producing compounds containing carbon, hydrogen, and oxygen, by passing a gaseous mixture consisting of hydrogen and an oxide of carbon mixed in suitable proportions at elevated temperature and pressure over suitable catalytic agents operating in a primary and a secondary system, which comprises, first passing said gaseous mixture over the catalyst of said primary system, and removing the compounds formed, then recirculating a portion of the residual gases over the same catalytic agent, while passing another portion of said residual gases over the catalyst of said secondary system, and removing the compounds formed with each passage of gases over said catalysts, and purging from said secondary system after the removal of compounds formed, and replacing the gases removed with fresh gas supplied to the catalyst of primary system.

FORREST C. REED.